UNITED STATES PATENT OFFICE.

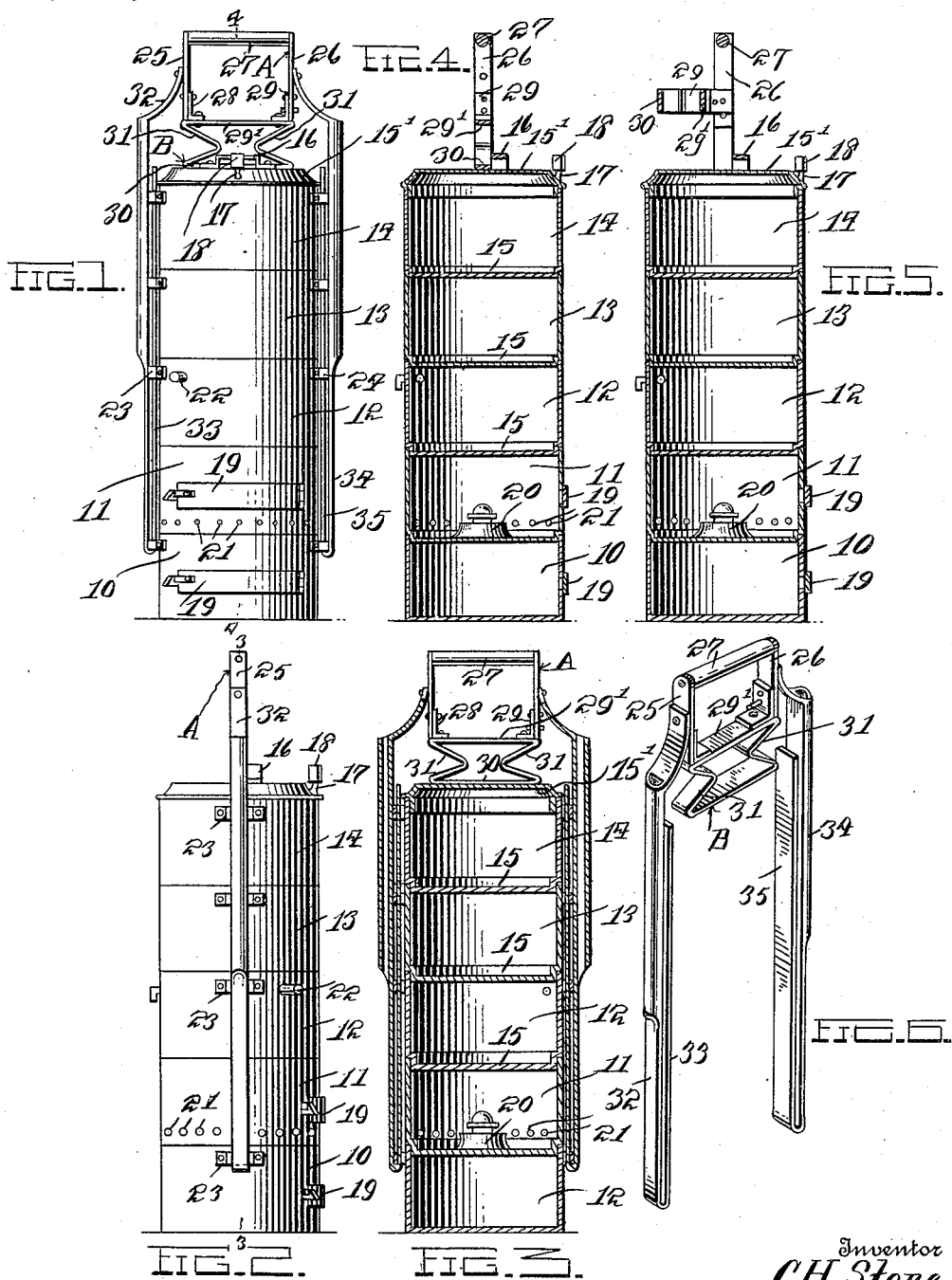

CHARLES H. STONE, OF MANILA, PHILIPPINE ISLANDS.

DINNER-PAIL.

1,065,633.  Specification of Letters Patent.  Patented June 24, 1913.

Application filed September 12, 1912.  Serial No. 720,001.

*To all whom it may concern:*

Be it known that I, CHARLES H. STONE, a citizen of the United States, residing at Manila, in the Province of Rizal, Philippine Islands, have invented certain new and useful Improvements in Dinner-Pails; and I do hereby declare the following to be a full, clear, and exact description of the invention, such as will enable others skilled in the art to which it appertains to make and use the same.

This invention relates to dinner pails.

The object of the invention resides in the provision of a dinner pail which comprises a plurality of compartments superimposed upon each other in a removable manner and so constructed that the aroma of the food within one of the compartments cannot reach the food within the remaining compartments.

A further object of the invention resides in the provision of a dinner pail of the character referred to in which the food in desired compartments may be maintained heated and the food in other compartments removed from the influence of the heat.

A still further object of the invention resides in the provision of a dinner pail which will be simple in construction, compact, and which may be manufactured and sold at a comparatively small cost.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a front elevation of a dinner pail constructed in accordance with the invention, Fig. 2, a side elevation of same, Fig. 3, a section on the line 3—3 of Fig. 2, Fig. 4, a section on the line 4—4 of Fig. 1, Fig. 5, a view similar to Fig. 4 showing the handle positioned to permit the application or removal of the different compartments, and Fig. 6, a detail perspective view of the handle and the compartment supporting arms which are suspended from the handle.

Referring to the drawing a pail is shown as comprising a plurality of superimposed compartments shown in this instance as five in number and indicated by the numerals 10, 11, 12, 13 and 14. The compartments 11, 12, 13 and 14 are provided with open upper ends and have their lower ends closed and reduced as at 15 so as to fit snugly in a telescoping manner within the opened upper end of the compartment next below. The uppermost compartment 14 has its open upper end provided with a removable closure 15' having a handle 16 and provided with an upwardly directed stud 17 upon which is adapted to be removably supported a cup 18. The lowermost compartment 10 is provided with a plain bottom as it is adapted to support the pail when not in use. The compartment 10 is provided with a hinged door 19 as is likewise the compartment 11. This last named compartment 11 is adapted to house a suitable lamp 20 which may be lighted conveniently by swinging the door 19 to open position. Air is supplied to the lamp 20 through the medium of perforations 21 formed in the lower portion of the side wall of said compartment 11. The compartment 12 is particularly adapted for holding liquid such as coffee so that the latter may receive the direct influence of the flame of the lamp 20 and is provided at the upper end of its side walls with a suitable vent 22. The compartment 10 is adapted to hold bread or other food that it is desired to shield from the influence of the heat of the lamp 20. Each of the compartments 10, 12, 13, and 14 has mounted on its side walls at diametrically opposite portions eye members 23 and 24 which serve to detachably engage the supporting arms of the handle as will hereinafter appear.

The handle proper of the pail is shown as comprising a U-shaped member A which includes arms 25 and 26 and a bight portion 27, the latter constituting the grip of the handle. Pivotally secured to the inner face of the arms 25 and 26 are angle members 28 and 29 respectively and secured to these angle members is a frame B including a top 29', a bottom 30 and inwardly directed V-shaped side members 31. Connected at its upper end to the arm 25 of the U-shaped member A and above the pivot of the angle member 28, is a supporting arm 32 the free end of which is bent inwardly and upwardly as at 33. Another supporting arm 34 is connected to the arm 26 of the U-shaped member A in a manner similar to the arm 32 and also has its free end bent inwardly and upwardly to form a portion 35 identical with the portion 33 of the arm 32. By this construction it will be apparent that the frame B can be swung so as to extend at right angles to the arms 32 and 34. In assembling the pail the frame B is moved to the position shown in Fig. 5 so as to permit the compartments to be inserted between the arms 32 and 34 with the eye members 23 and 24 in alinement with the portions 33 and 35 of the arms 32 and 34. The compartment 10 is first positioned between the arms 32 and 34 and then moved downwardly with the eye members 23 and 24 engaged over the portions 33 and 35 until said eye members engage the lower bent portion of the arms 32 and 34 where said compartments will be efficiently supported by the arms 32 and 34. The remaining compartments are then applied in a similar manner and the closure 15′ in turn applied to the compartment 14. The frame B is then moved to the position shown in Fig. 4 which will bring the bottom 30 of the frame B in engagement with the closure 15′ and lock the various compartments against removal. The upper portions of the arms 32 and 34 are formed tubular so as to strengthen said arm and constitute a holder for a knife and fork respectively.

What is claimed is:

A dinner pail comprising a U-shaped handle member a frame pivotally secured to the free ends of its arms and disposed in the same plane therewith, supporting arms secured to the arms of the U-shaped handle member, said supporting arms having their free ends bent inwardly and upwardly, a plurality of superimposed compartments provided with eye members slidably engaged over the upwardly bent portions of the supporting arms, and a closure for the uppermost compartment adapted to be engaged by said frame in one position thereof to secure the compartments against movement upwardly of the supporting arms.

In testimony whereof, I affix my signature, in presence of two witnesses.

CHARLES H. STONE.

Witnesses:
SAMUEL STICKNEY,
BENJ. P. LUKENS.

---

Copies of this patent may be obtained for five cents each, by addressing the "Commissioner of Patents, Washington, D. C."